United States Patent [19]

Reeve et al.

[11] 4,039,372

[45] Aug. 2, 1977

[54] BLEACH PLANT FILTRATE RECOVERY

[75] Inventors: Douglas W. Reeve, Orton, Canada; Gordon Rowlandson, Appleton, Wis.; W. Howard Rapson, Scarborough, Canada

[73] Assignee: Erco Envirotech Ltd., Islington, Canada

[21] Appl. No.: 665,240

[22] Filed: Mar. 9, 1976

[30] Foreign Application Priority Data

Mar. 11, 1975 United Kingdom ............... 10016/75

[51] Int. Cl.$^2$ ...................... D21C 3/26; D21C 11/04
[52] U.S. Cl. .................... 162/19; 162/30 R; 162/60; 162/89; 162/DIG. 8
[58] Field of Search ............. 162/19, 29, 30 R, 30 K, 162/51, 89, DIG. 8, 60

[56] References Cited

U.S. PATENT DOCUMENTS

| | | | |
|---|---|---|---|
| 3,183,145 | 5/1965 | Collins | 162/51 |
| 3,269,941 | 8/1966 | Compte et al. | 162/30 K |
| 3,453,174 | 7/1969 | Rapson | 162/DIG. 8 |
| 3,698,995 | 10/1972 | Rapson | 162/DIG. 8 |
| 3,746,612 | 7/1973 | Rapson et al. | 162/30 R |
| 3,909,344 | 9/1975 | Lukes | 162/19 |
| 3,945,880 | 3/1976 | Lukes et al. | 162/19 |
| 3,950,217 | 4/1976 | Reeve | 162/19 |

*Primary Examiner*—S. Leon Bashore
*Assistant Examiner*—Peter F. Kratz
*Attorney, Agent, or Firm*—Sim & McBurney

[57] ABSTRACT

Acid and alkaline filtrates are separated from the bleach plant of a bleached pulp mill for use in washing unbleached pulp free from entrained pulping liquor. Acid effluent is neutralized with sodium hydroxide solution prior to use in the washing as the last washing step while alkaline filtrate is used in the remainder of the washing. Part of both the acid and alkaline filtrates are not used in the washing to allow bleed of calcium value and caustic extraction stage solids which otherwise would build up on the washed pulp mat passing to the bleach plant.

13 Claims, 2 Drawing Figures

BLEACH PLANT FILTRATE RECOVERY

FIELD OF INVENTION

The present invention relates to the recovery of liquid bleach plant effluents or filtrates.

BACKGROUND TO THE INVENTION

In a bleached pulp mill, pulp is formed by digestion of cellulosic fibrous material in a pulping liquor and thereafter is separated from spent pulping liquor. The spent pulping liquor is subjected to recovery and regeneration operations to form fresh pulping liquor for recycle. The pulp is subjected to bleaching and purification in a bleach plant operation. In the bleach plant, treatment chemicals, commonly in aqueous solutions, and wash water are used in the bleaching and purification of the pulp, to provide one or more aqueous bleach plant effluents containing spent chemicals and spent wash water. Such bleach plant effluents usually are discharged, possibly after treatment, to water bodies. The discharge of such bleach plant effluents to water bodies is environmentally hazardous and, hence, objectionable.

Bleach plant operations generally involve bleaching with chlorine, chlorine dioxide, mixtures of chlorine and chlorine dioxide, or other chlorine-containing chemicals and may include oxygen bleaching or delignification, and purification using aqueous sodium hydroxide solution. The pulp usually is washed after each bleaching and/or purification step.

There has previously been proposed in U.S. Pat. No. 3,698,995 one manner of avoiding discharge of the bleach plant effluent or filtrate to water bodies and in this proposal a single liquid effluent is provided from the bleach plant by mixing together the spent aqueous filtrates from each bleach plant operation and the single liquid effluent is used to wash pulp free from spent pulping liquor prior to feed of the pulp to the bleach plant. The bleach plant effluent, after being used in this washing operation is mixed with the spent pulping liquor and passes to the recovery and regeneration operations with the spent pulping liquor, thereby retaining the bleach plant effluent in the mill and avoiding its discharge. Additionally, the prior art fresh water requirement for unbleached pulp washing is decreased by this procedure.

Operation in accordance with the aforementioned U.S. Pat. No. 3,698,995 has proved to give rise to practical difficulties in many cases, resulting from the presence of minor components in the effluent, such as calcium ions, which, in the presence of black liquor solids, may coprecipitate with lignin moities on the pulp, hence returning to the bleach plant and giving rise to increased chemical consumption. Further, insoluble compounds, such as calcium lignin and calcium carbonate, may precipitate on equipment, causing operational difficulties which may lead to downtime for cleaning.

Additionally, organic material dissolved in the purification stages and present in the combined effluent will not be fully removed from the pulp in the washing before the pulp returns to the bleach plant, again increasing chemical consumption.

Moreover, the volume of the combined effluent may be greater than that required for the washing, thereby increasing the evaporative load on the black liquor evaporator.

SUMMARY OF INVENTION

In accordance with the present invention, the difficulties of the prior art procedure of U.S. Pat. No. 3,698,995 are overcome while retaining the practical benefits described in U.S. Pat. No. 3,698,995 of washing the pulp with bleach plant filtrates rather than fresh water and of feeding all the liquid effluent of the bleach plant directly or indirectly to the pulp mill spent pulping liquor recovery and regeneration operation.

DESCRIPTION OF PREFERRED EMBODIMENTS

Figure 1:
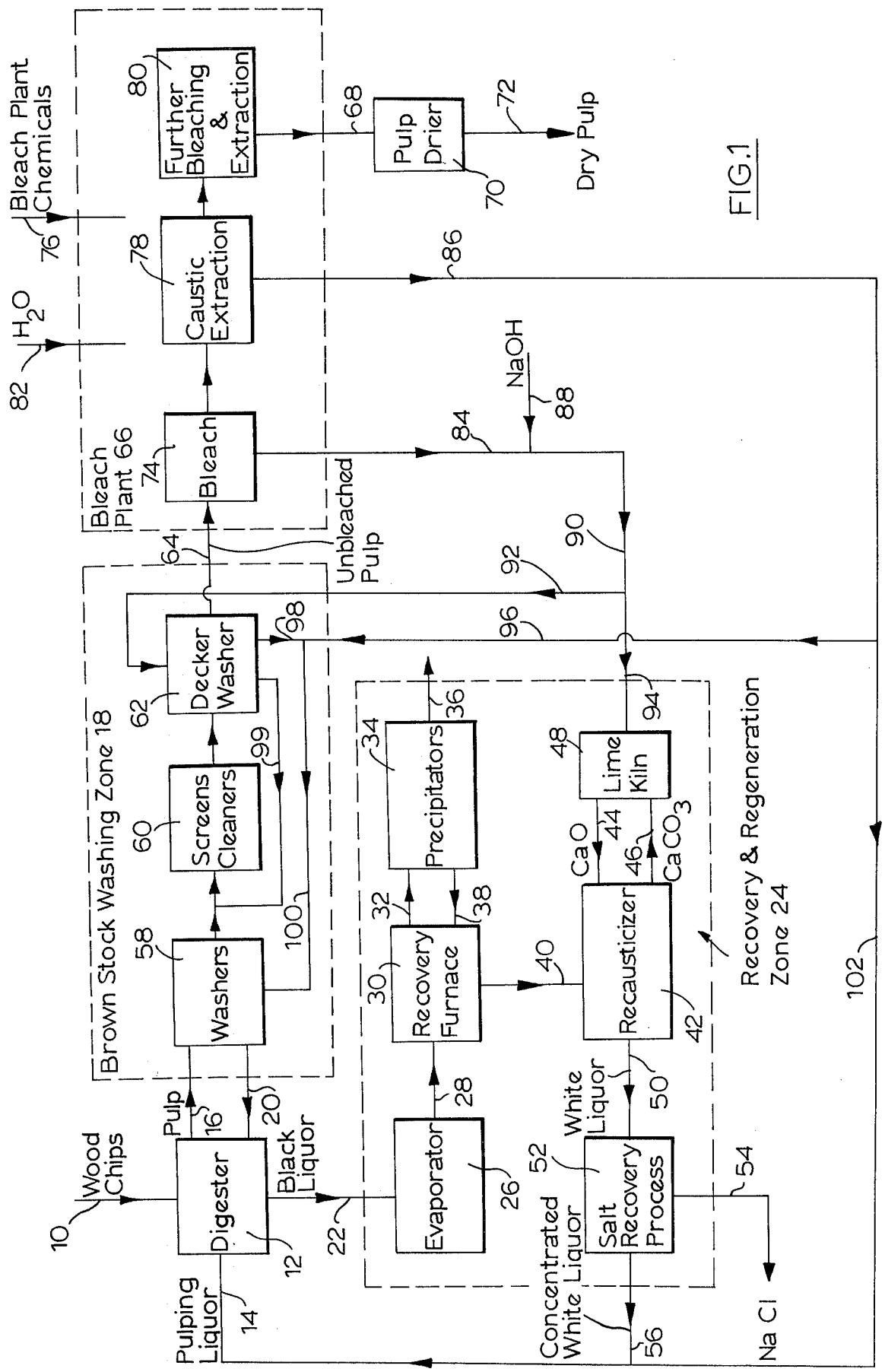
FIG. 1 is a schematic flow sheet of one embodiment of the invention.

Referring first to FIG. 1 of the drawings, wood chips or other comminuted cellulosic fibrous material, is fed by line 10 to a continuous digester 12 or a number of batch digesters wherein the pulp is subjected to the pulping action of a pulping liquor fed thereto by line 14.

A variety of pulping procedures may be used, including the kraft, soda, soda-oxygen, $H_2S$-pretreatment kraft, alkafide, polysulfide and alkaline sulfite processes. The invention will be described with particular reference to the kraft process, although it will be understood that the invention also is applicable to other pulping procedures with appropriate modification to the recovery and regeneration steps to take into account the active chemicals used.

In the kraft process, the active pulping chemicals are sodium hydroxide and sodium sulphide and these chemicals are contained in the pulping liquor fed by line 14.

After the digestion, the resulting wood pulp containing residual spent pulping liquor passes by line 16 to a brown stock washing zone 18 for washing free from entrained spent pulping liquor as described in more detail below.

The spent pulping liquor, or black liquor, together with used wash water from the brown stock washing zone 18 in line 20 arising as described in more detail below, are fed by line 22 to a recovery and regeneration zone 24. Some washing may occur in the digester using the wash water in line 20.

The waste liquor in line 22 first is subjected to evaporation in an evaporator 26 to decrease the bulk of the waste liquor before passage of the concentrated waste liquor by line 28 to a recovery furnace 30.

In the recovery furnace 30, the organic material content of the concentrated waste liquor is burned off, and the spent pulping chemicals form principally sodium carbonate and sodium sulphide.

The gases from the recovery furnace in line 32 contains entrained solids which are removed by electrostatic precipitators 34 before discharge of the flue gas by line 36. To avoid loss of potentially-valuable chemicals, the precipitated solids are returned from the precipitators 34 to the furnace 30 by line 38.

The liquified smelt material recovered from the furnace 30 consists mainly of sodium carbonate and sodium sulphide. There are usually small quantities of sodium sulphate and other sodium and sulphur-oxygen salts also present in the smelt, the quantity depending on the efficiency of the furnace 30. It is usual to compensate for losses of pulping chemicals from the system by adding make-up quantities of sodium-and/or sulphur-containing compounds, such as, sodium sulphate.

The mixing of the used wash water from the brown stock washing zone 18 into the black liquor fed to the recovery and regeneration zone 24 introduces sodium chloride to the waste liquor, the sodium chloride arising from the spent bleach plant chemicals, as will become more apparent below. Since the sodium chloride is unaffected by the furnacing procedure, sodium chloride also generally is present in the smelt.

Typical ranges of quantities of the components of the smelt formed in the recovery furnace 30 are as follows, the figures for both kraft mill smelt and soda mill smelt being given:

| Component | Kraft Mill | Soda Mill |
|---|---|---|
| | (wt. %) | |
| $Na_2S$ | 7 to 22 | 0 to 4 |
| $Na_2CO_3$ | 60 to 78 | 70 to 90 |
| $Na_2SO_4$ | 1 to 6 | 0 to 3 |
| NaCl | 10 to 25 | 10 to 25 |

The smelt is passed from the furnace 30 by line 40 to a recausticizer for conversion of most of the sodium carbonate to sodium hydroxide. Typically, the smelt is made up into an aqueous solution, or green liquor, prior to passage by line 40 to the recausticizer.

In the recausticizer 42, the green liquor is contacted with reburned lime fed by line 44, resulting in precipitation of calcium carbonate from the resulting white liquor. After separation of the lime mud from the white liquor, the mud is passed by line 46 to a lime kiln 48 for regeneration of lime for the recausticization.

The white liquor resulting from the recausticizer 42 in line 50 contains the sodium chloride content of the smelt and the sodium chloride would build up in the system if not purged. The white liquor in line 50, therefore, is subjected to a salt recovery operation 52 to concentrate the white liquor and result in separation of pure sodium chloride which is removed from the recovery and regeneration zone 24 by line 54.

The salt recovery operation 52 may be one of those described in U.S. Pat. No. 3,746,612 or U.S. Application Ser. No. 423,998 (now U.S. Pat. No. 3,950,217). Alternatively, as described, for example, in U.S. Applications Ser. Nos. 494,897 (now U.S. Pat. No. 3,945,880), 494,898 (now U.S. Pat. No. 3,986,923) and 495,088 (now U.S. Pat. No. 3,986,923), the sodium chloride removal may be carried out after furnacing and prior to recausticization.

Where the quantity of sodium chloride present in the white liquor in line 50 is inconsequential or non-existent, then the salt recovery process operation 52 may be omitted.

The concentrated white liquor in line 56 and formed in the salt recovery operation 52, after dilution as described below, is recycled by line 14 to the digester 12 for pulping of further wood chips.

The pulp in line 16 is subjected to washing in the brown stock washing zone 18 by successive passage through washers 58, screens and cleaners 60 and decker-washer 62 before discharge of the unbleached pulp from the brown stock washing zone 18 by line 64 to a bleach plant 66.

In the bleach plant 66, the pulp is subjected to a plurality of bleaching, caustic extraction and washing operations as described in more detail below to result in bleached, purified and washed pulp of the required brightness and purification and discharged from the bleach plant 66 by line 68 for passage to a pulp dryer 70 to provide dried pulp in line 72, directly to an on-site paper mill or to make wet lap, if desired.

The bleach plant 66 may employ any convenient bleaching sequence, although the invention is described more particularly with reference to the so-called D/CEDED sequence, wherein D/C represents bleaching with a mixture of chlorine dioxide and chlorine predominating in chlorine dioxide, D represents bleaching with chlorine dioxide solution and E represents caustic extraction with sodium hydroxide solution. Other possible bleach plant sequences include DEDED, CEDED, CEHD, D/CEHD, CEHDED, D/CEHDED, CEHED, D/CEHED, CEHEDEDP, D/CEHEDEDP, CED, D/CED, DED, CH/EDED, D/CH/EDED, CH/ED, D/CH/ED, $D_c$EDED, $D_c$ED, COD, and each of the above sequences with an initial O step in place of or prior to the initial bleaching step with or without an acid wash prior to the O step, where $D_c$ denotes sequential bleaching with chlorine dioxide followed by chlorine, P denotes bleaching with hydrogen peroxide, H denotes bleaching with sodium hypochlorite, O denotes bleaching with oxygen, and H/E denotes caustic extraction using sodium hydroxide and sodium hypochlorite. Typically, the pulp is washed after each bleaching and each caustic extraction operation.

Figure 2:
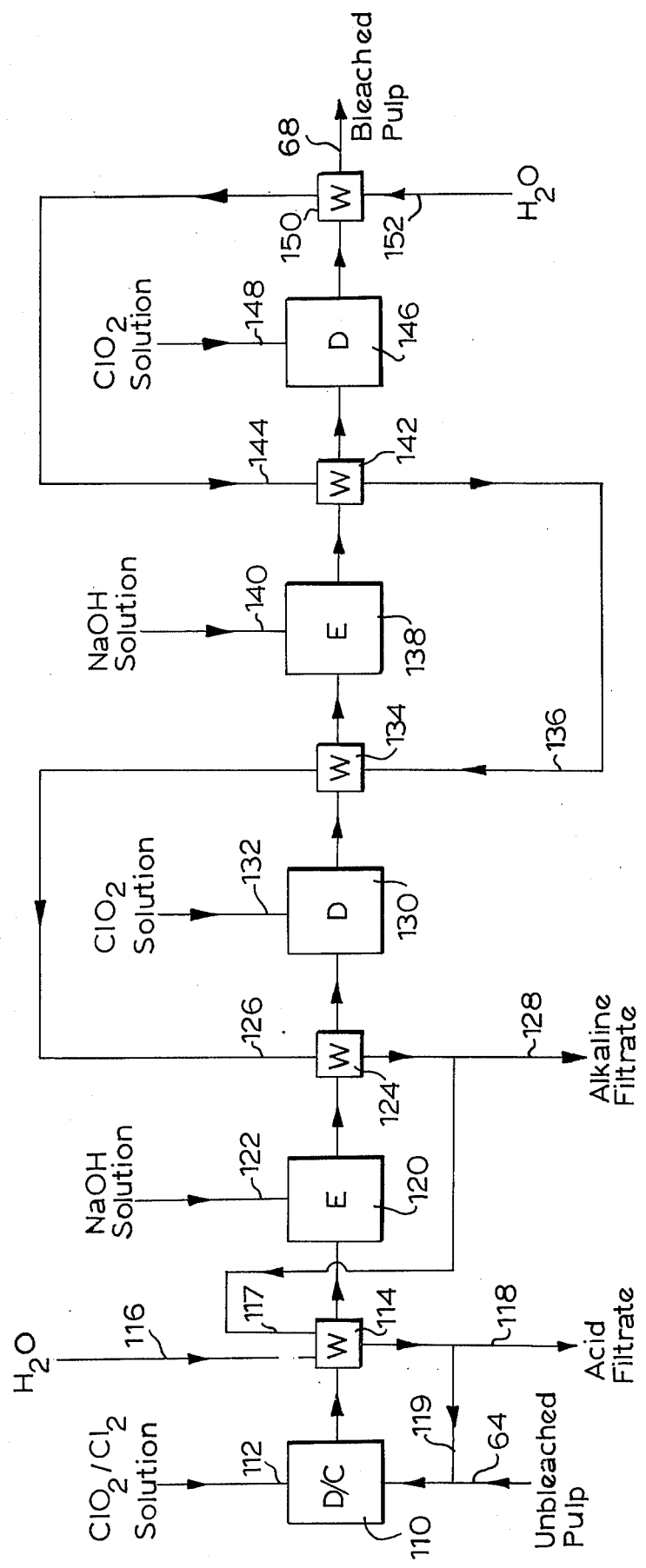
FIG. 2 is a schematic flow sheet of a typical bleach plant for use with the embodiment of FIG. 1.

The bleach plant 66 is shown schematically in FIG. 1 and a typical bleach plant operation which may be used in the embodiment of FIG. 1 is shown in more detail in FIG. 2.

As seen in the schematic representation of FIG. 1, the bleach plant 66 includes a first bleaching stage 74 wherein the pulp is bleached with chlorine, chlorine dioxide or, preferably, a mixture of chlorine dioxide and chlorine containing chlorine dioxide in an amount equivalent to about 70% of the total available chlorine of the mixture. The chlorine may be added at least partially as chlorine gas or as sodium hypochlorite.

The bleaching agent used in the first bleaching stage 74 is fed with other bleach plant chemicals through line 76 to the bleaching stage 74.

The bleached pulp, after washing substantially free from bleach plant chemicals, passes to a first caustic extraction stage 78 wherein the pulp is subject to a first purification with caustic soda solution, fed as part of the bleach plant chemicals feed in line 76.

The caustic extracted pulp, after washing substantially free from caustic extraction chemical, then passes to further bleaching and extraction stages 80, such as those outlined in more detail below in connection with FIG. 2, before discharge from the bleach plant 66 by line 68.

An external feed of wash water for use in the bleach plant 66 is present in line 82.

In accordance with the present invention, two liquid effluents or filtrates from the bleach plant 66 are provided. One of the filtrates is the acid filtrate resulting from the first bleach stage 74, which contains the spent bleach chemical and spent wash water from that stage and part of the spent chemicals and spent wash water from subsequent stages, is removed from the bleach plant 66 by line 84.

The other filtrate of considerably lesser volume than the acid filtrate in line 84, is removed from the first stage caustic extraction 78 by line 86 and contains some of the spent caustic extraction liquor and may also contain part of the liquid effluents from the further bleaching and caustic extraction stages 80 with their attendant washings.

The acid filtrate in line 84 usually first is neutralized using fresh sodium hydroxide solution fed by line 88 to provide neutralized filtrate in line 90. Fresh sodium hydroxide solution is used for the neutralization through addition by line 88 to balance the overall system with respect to sodium and chlorine, thereby compensating for the difference between the amount of sodium needed to process the pulp and the amount of compounds containing chlorine atoms needed for bleaching. Additionally, no further contaminants are introduced to the acid filtrate by using fresh sodium hydroxide solution as compared to the use of filtrate from line 86.

Part of the neutralized acid filtrate then is passed to the brown stock decker 62 by line 92 to wash pulp therein as the last washing carried out on the pulp prior to its discharge from the brown stock washing zone before passage of the pulp to the bleach plant 66 by line 64. Not all of the neutralized acid filtrate is passed to the decker 62 by line 92 since it contains quantities of calcium salts removed from the pulp in the first bleaching stage 74 which thereby would build up in the pulp passing to the bleach plant 66, increasing substantially the chemical requirements.

Calcium typically is present in woods to a greater or lesser extent depending on the species. Normally such calcium is purged from the bleach plant by the discharge of the bleaching filtrate from the mill. Once the filtrate is used to wash pulp entering the mill, the calcium has the opportunity to accumulate, if no purge occurs.

Hence, only part of the neutralized acid effluent is passed by line 92 to the brown stock decker 62 and the remainder is passed by line 94 to the kiln scrubber of the lime kiln 48, as a displacement for all or part of the water conventionally used in this scrubbing, thereby purging calcium from the bleach plant area while still retaining all the effluent in line 90 within the mill. The purge of calcium to the causticizing area in this way may decrease the overall calcium makeup requirement of the recausticization area.

The passage of the filtrate in line 94 to the kiln scrubber in this way results in the sodium chloride content of the filtrate in line 94 by-passing the furnace, so that the sodium chloride load on the furnace is decreased.

This would not be the case if the filtrate in line 94 were used to dilute the white liquor in line 56 since the sodium chloride content of the filtrate would recycle with the white liquor to the furnace. Further, utilization of the filtrate in line 94 would not lead to a positive purge of calcium from the system.

Where some discharge of effluent can be tolerated, the portion of the acid filtrate in line 94 may be wholly or in part passed to sewer. Alternatively to, or in combination with, feed of the filtrate by line 94 to the kiln scrubber, the filtrate in line 94 may be used in forming the smelt solution in line 40 or in lime mud washing followed by use in forming the smelt solution in line 40.

In view of the alkaline nature of the materials scrubbed in the lime kiln scrubber, it may be desirable to neutralize only the part of the acid filtrate in line 84 which is being passed to the brown stock washer decker 62, with the remaining unneutralized acid filtrate passing directly to the kiln scrubber for neutralization by the alkaline materials therein.

Neutralization of the portion of the acid filtrate used in the brown stock decker 62 by fresh sodium hydroxide solution fed by line 88 is essential for reasons other than the necessity to balance sodium and chlorine values. Thus, due to the acid nature of the filtrate in line 84 it is undesirable to use the same directly on the decker 62 due to possible corrosion to metal parts and the possibility of hydrogen sulphide formation from reaction with residual sulphides (pulping values) in the pulp mat.

Storage facilities, not shown, may be provided, if desired, for the acid filtrate and the alkaline filtrate.

The caustic extraction filtrate in line 86 partly is passed to brown stock washing by line 96 to a stage of washing more remote from the bleach plant 66 than the washing carried out with the neutralized acid filtrate. For example, part of the filtrate in line 96 may be used as wash water on the first showers of the decker 62, while the neutralized filtrate in line 92 is used as wash water on the final showers of the decker 62. This procedure allows the discharge of a neutral clean pulp from the brown stock washing zone 18 to the bleach plant 66.

In the illustrated embodiment, the caustic extraction filtrate in line 96 is mixed with the part of the liquor displaced on the decker 62 and present in line 98. The resulting solution is passed by line 100 to the washers 58 for use as wash water.

The remainder of the liquor displaced on the decker 62 and present in line 99 is passed to the screens and cleaners 60 to act as wash water and stock diluent liquor therein.

The spent wash water from the brown stock washing zone 18 constituted by the liquid fed thereto by lines 92 and 96 and in the pulp in line 16 less liquid associated with the pulp in line 64, passes by line 20 to mix with the black liquor, as discussed above.

The liquor in line 20 may be used in the washing zone of a continuous digester, if such a digester is used as digester 12.

The remainder and generally the bulk of the caustic extraction filtrate in line 102 is used to dilute the concentrated white liquor in line 56 to provide the recycled pulping liquor in line 14. The addition of caustic extraction filtrate to the concentrated white liquor in this way has been found to have no adverse effects on the pulping and the recovery of spent liquor. The separation of the caustic extraction filtrate in line 86 into two parts and the use of part thereof for dilution of the concentrated white liquor purges caustic extraction stage solids which otherwise would tend to build up if all the caustic extraction filtrate were passed to the brown stock washing zone 18.

The presence of such solids in increasing quantities tends to increase the bleaching chemical requirement in bleaching stages before and after the first caustic extraction stage.

It is possible to pass part of the caustic extraction filtrate to the causticizing area to provide the desired solids purge, but this alternative may be less desirable since the large quantities of organics involved may give rise to problems in efficient lime mud settling, dewatering and washing, resulting in poor white liquor clarity and mud filter blinding.

The alkaline effluent in line 86 may be concentrated, if desired, prior to use as described above.

A typical bleach plant utilizing the D/CEDED sequence and for use as the bleach plant 66 in the embodiment of FIG. 1 is illustrated schematically in FIG. 2. As shown therein, unbleached pulp in line 64 is passed to a first bleaching stage 110 to which an aqueous solution of chlorine dioxide and the chlorine is fed by line 112 for bleaching of the pulp under any desired conditions.

The pulp then is separated from spent bleaching chemical solution in a first washer 114 and washed substantially free from entrained liquor by wash water fed by line 116 followed by wash water from line 117. The resulting mixture of spent bleaching chemical solution and spent wash water is removed from the bleach plant by line 118 as the acid filtrate in line 84 in the embodiment of FIG. 1.

Typically, the unbleached pulp from the decker-washer is diluted prior to the passage to the first bleaching stage, and it is preferred to utilize part of the filtrate in line 118 for this purpose, as indicated by line 119.

The washed and partially bleached pulp next is passed to a first caustic extractor 120 to which aqueous sodium hydroxide solution is fed by line 122 for purification of the pulp using conventional conditions.

The caustic extracted pulp is separated from spent caustic extraction solution in a second washer 124 and washed substantially free from entrained liquor by wash water fed by line 126. The wash water in line 126 arises from washing operations carried out countercurrent to the flow of pulp through the bleach plant, as described in more detail below.

The mixture of spent caustic extraction solution and spent wash water from the washer 124 forms the alkaline filtrate from the bleach plant by line 128 and constitutes the filtrate in line 86 in the embodiment of FIG. 1.

The washed caustic extracted pulp then passes to a second bleaching stage 130 wherein the pulp is contacted with chlorine dioxide solution fed by line 132 to bleach the pulp further. The thus-bleached pulp is separated from spent bleaching chemical solution and washed free from entrained chemical in a washer 134. The wash water for the washer 134 is fed by line 136 as spent liquor from subsequent washing stages. The effluent from the washer 134 passes to the washer 124 by line 126.

The pulp then is fed to a second caustic extractor 138 wherein the pulp is further purified by aqueous sodium hydroxide solution fed by line 140, before being separated from spent sodium hydroxide solution and washed free from entrained liquor in a washer 142 to which wash water is fed by line 144. The wash water in line 144 arises from a later washing operation and the liquid effluent from the washer 142 passes to the washer 134 by line 136.

The washed and extracted pulp resulting from the washer 142 is passed to a third bleaching stage 146 for the final step by the action of chlorine dioxide solution fed by line 148. The pulp is separated from the spent bleaching chemical solution and washed free from entrained liquor in a washer 150 before discharge of the bleached, purified and washed pulp of the required brightness and purity from the bleach plant by line 68.

The wash water for the washer 150 is fed by line 152 from a source external of the bleach plant, and may be provided by fresh water, process condensate from the black liquor evaporation, condenser condensate from the white liquor evaporation, pulp drier white water, or a combination of these sources.

The liquor resulting from the washer 150 containing spent bleaching chemical solution and spent wash water is forwarded by line 144 to the washer 142. By utilization of the effluent from one washing in the washing of the pulp at a preceding stage, the alkaline filtrate discharged in line 128 contains the spent chemical solutions used in the EDED stages and wash water added by line 152. Part of the alkaline filtrate is used to provide part of the wash water fed to washer 114 by line 117. Hence, all the liquids introduced to the bleach plant by way of bleaching and purification chemicals and wash water and with the unbleached pulp are removed from the bleach plant mainly in the acid filtrate in line 118 and the alkaline filtrate 128 with some added wash water passing out of the bleach plant in the bleached pulp in line 68.

Since the filtrates in lines 118 and 128 are introduced to a closed loop mill cycle as described in connection with the liquors in lines 84 and 86 in FIG. 1, toxic and coloured effluents from the bleach plant are retained within the mill and not discharged to water bodies.

The invention is further illustrated by the following Example:

EXAMPLE

A mass water balance for the embodiment of FIG. 1 was calculated for a 500 ton/day pulp mill. The following values were obtained in U.S. gallons per minute:

Line 76 : 413
Line 82 : 1333
Line 68 : 776
Line 64 : 836
Line 84 : 1280
Line 86 : 526
Line 88 : 8
Line 90 : 1369 (81 make up)
Line 92 : 1044
Line 94 : 325
Line 96 : 158
Line 102 : 368
Line 50 : 466
Line 56 : 98
Line 98 : 1241
Line 100 : 1399

At the rate of flow of 325 USGM to the lime kiln scrubber by line 94 results in the purging of 2000 lbs of calcium ion per day and controls the calcium ion concentration in the filtrate in line 84 at a steady state value less than 510 ppm.

SUMMARY

The present invention, therefore, provides an efficient means of handling the effluents of a bleach plant to minimize fresh water requirements and realize the effluent free mill concept. Modifications are possible within the scope of the invention.

What we claim is:

1. In a pulp mill system having a pulping and recovery and regeneration cycle and a bleaching and purification operation including the steps of
    digesting raw cellulosic fibrous material in a pulping liquor,
    washing the digested cellulosic fibrous material substantially free from spent pulping liquor,
    forming an aqueous spent liquor containing spent pulping liquor and spent wash water from said washing step,
    subjecting said aqueous spent liquor to furnacing to form a smelt,
    subjecting said washed digested cellulosic fibrous material to said bleaching and purification operation using bleaching chemicals including chlorine atoms and sodium hydroxide extraction solutions, washing said bleach and purified pulp substantially free from residual bleaching and purification chemicals, recovering a washed, bleached and purified pulp from said bleaching and purification operation, separating from said bleaching and purification operation an acid aqueous filtrate and an alkaline aqueous filtrate, said latter filtrates in combination including all the aqueous material introduced to said bleaching and purification operation less any water present in said washed, bleached and purified pulp, introducing said latter filtrates to said pulping and recovery and regeneration cycle, whereby said smelt contains sodium chloride, regenerating pulping liquor from the components of said smelt, recycling said regenerated pulping liquor as at least part of said pulping liquor in said digestion step, and separating solid sodium chloride from said pulping and recovery and regeneration cycle subsequent to said furnacing step and prior to said recycling step, the improvement wherein said introduction of said filtrates to said pulping and recovery and regeneration cycle is carried out by:

neutralizing part only of said acid filtrate with fresh aqueous sodium hydroxide solution for use as wash water, using said neutralized filtrate as wash water for washing said digested cellulosic fibrous material in the portion of said washing step immediately prior to passage of washed pulp to said bleaching and purification operation, and using part only of said alkaline filtrate as wash water for washing said digested cellulosic fibrous material prior to said washing with said neutralized filtrate in the remainder of said washing step, whereby said washing step is carried out wholly by said neutralized filtrate and said part of said alkaline filtrate.

2. In a pulp mill system having a pulping and recovery and regeneration cycle and a bleaching and purification operation including the steps of digesting raw cellulosic fibrous material in a pulping liquor including sodium hydroxide as at least one active pulping chemical, washing the digested cellulosic fibrous material substantially free from spent pulping liquor, forming an aqueous spent liquor containing spent pulping liquor and spent wash water from said washing step, subjecting said aqueous spent liquor to furnacing to form a smelt, subjecting said washed digested cellulosic fibrous material to said bleaching and purification operation using bleaching chemicals including chlorine atoms and sodium hydroxide extraction solutions, washing said bleached and purified pulp substantially free from residual bleaching and purification chemicals, recovering a washed, bleached and purified pulp from said bleaching and purification operation, separating from said bleaching and purification operation an acid aqueous filtrate and an alkaline aqueous filtrate, said latter filtrates in combination including all the aqueous material introduced to said bleaching and purification operation less any water present in said washed, bleached and purified pulp, introducing said latter filtrates to said pulping and recovery and regeneration cycle, whereby said smelt contains sodium chloride, regenerating pulping liquor from the components of said smelt by causticizing sodium carbonate in said smelt in aqueous solution by causticization reaction with lime to form sodium hydroxide from said sodium carbonate and precipitate calcium carbonate, separating said precipitated calcium carbonate from the resulting pulping liquor, kilning said separated calcium carbonate to form lime for recycle to said causticization reaction and scrubbing flue gases from said kilning to remove entrained particles, recycling said resulting pulping liquor as at least part of said pulping liquor in said digestion step, and separating solid sodium chloride from said pulping and recovery and regeneration cycle subsequent to said furnacing step and prior to said pulping liquor recycling step by concentrating said resulting pulping liquor after said separation of precipitated calcium carbonate to deposit sodium chloride therefrom, removing the deposited sodium chloride from the resulting concentrated pulping liquor and diluting the concentrated pulping liquor to the desired pulping liquor concentration for said pulping liquor recycling step, the improvement wherein said introduction of said filtrates to said pulping and recovery and regeneration cycle is carried out by:

neutralizing part of said acid filtrate with fresh aqueous sodium hydroxide solution, using said neutralized filtrate as wash water for washing said digested cellulosic fibrous material in the portion of said washing step immediately prior to passage of washed pulp to said bleaching and purification operation, passing the remainder of said acid filtrate to said regeneration operation for use as an aqueous medium therein subsequent to said furnacing step and prior to said recycle step while excluding said remainder of said acid filtrate from said recycled pulping liquor, using part of said alkaline filtrate as wash water for washing said digested cellulosic fibrous material prior to washing with said neutralized filtrate in the remainder of said washing step, whereby said washing step is carried out wholly by said neutralized filtrate and said part of said alkaline filtrate, and using the remainder of said alkaline filtrate for said diluting of the concentrated pulping liquor to the desired pulping liquor concentration.

3. The system of claim 2 wherein at least part of said remainder of said acid filtrate is passed to said regeneration operation by use as wash water in said scrubbing.

4. The system of claim 2 wherein at least part of said remainder of said acid filtrate is passed to said regeneration operation by use in the formation of said aqueous solution containing sodium carbonate.

5. The system of claim 2 wherein said remainder of said acid filtrate is passed to said regeneration operation by use of part of said remainder of said acid filtrate as wash water in said scrubbing and part of said remainder of said acid filtrate in the formation of said aqueous solution containing sodium carbonate.

6. The system of claim 2 wherein at least part of said remainder of said acid filtrate is passed to said regeneration operation by washing said separated calcium carbonate with said at least part of said remainder of said acid filtrate and using the resulting aqueous solution in forming said aqueous solution containing sodium carbonate.

7. The system of claim 1 wherein the remainder of said acid filtrate is neutralized with fresh sodium hydroxide solution.

8. The system of claim 3 wherein said separation of solid sodium chloride is accomplished by concentrating said regenerated pulping liquor to deposit sodium chloride therefrom and removing the deposited sodium chloride from the resulting concentrated pulping liquor, and said remainder of said alkaline filtrate is used for dilution of said concentrated pulping liquor to the desired pulping liquor concentration for said recycle.

9. The system of claim 1, wherein said bleaching and purification operation includes successively a first bleaching stage in which said pulp is bleached with an aqueous solution of chlorine dioxide and chlorine in which the chlorine dioxide provides the majority of the total available chlorine and washed to remove spent bleaching agent and to provide the acid aqueous filtrate containing spent bleaching liquor and spent wash water, a first purification stage in which said pulp is purified with aqueous sodium hydroxide solution and washed to remove spent sodium hydroxide solution and to provide an alkaline aqueous filtrate containing spent sodium hydroxide solution and spent wash water, a second bleaching stage in which said pulp is bleached with an aqueous solution of chlorine dioxide and washed to remove spent bleaching agent and provide a second bleaching stage filtrate containing spent bleaching liquor and spent wash water, a second purification stage in which said pulp is purified with aqueous sodium hydroxide solution and washed to remove spent sodium hydroxide solution and provide a second purification stage filtrate containing spent sodium hydroxide solution and spent wash water, and a third bleaching stage in which said pulp is bleached with an aqueous solution of chlorine dioxide and washed to remove spent bleaching agent and to provide a third bleaching stage filtrate containing spent bleaching liquor and spent wash water, and said washed, bleached and purified pulp is discharged from said third bleaching stage and said bleaching and purification operation further includes using water from external the bleaching and purification operation as wash water in said third bleaching stage using at least part of said third bleaching stage filtrate as wash water in said second purification stage, using at least part of said second purification stage filtrate as wash water in said second bleaching stage, using at least part of said second bleaching stage filtrate as wash water in said first purification stage, using part of said first purification stage filtrate as wash water in said first bleaching stage and providing all of said second bleaching stage, second purification stage and third bleaching stage filtrates in said acid filtrate and/or said alkaline filtrate, whereby countercurrent flow of wash water and pulp through said bleaching and purification operation is achieved and all liquid flowing into the bleaching and purification operation, with the exception of that leaving the operation with said washed, bleached and purified pulp, is discharged therefrom in said acid filtrate and said alkaline filtrate.

10. In a pulp mill having a pulping and recovery and regeneration cycle and a bleaching and purification operation including the steps of digesting raw cellulosic fibrous material in a pulping liquor, washing the digested cellulosic fibrous material substantially free from spent pulping liquor, forming an aqueous spent liquor containing spent pulping liquor and spent wash water from said washing step, subjecting said aqueous spent liquor to furnacing to form a smelt, subjecting said washed digested cellulosic fibrous material to said bleaching and purification operation using bleaching chemicals including chlorine atoms and sodium hydroxide extraction solutions, washing said bleached and purified pulp substantially free from residual bleaching and purification chemicals, recovering a washed, bleached and purified pulp from said bleaching and purification operation, separating from said bleaching and purification operation an acid aqueous filtrate and an alkaline aqueous filtrate, said latter filtrates in combination including all the aqueous material introduced to said bleaching and purification operation less any water present in said washed, bleached and purified pulp, introducing said latter filtrates to said pulping and recovery and regeneration cycle, whereby said smelt contains sodium chloride, regenerating pulping liquor from the components of said smelt, recycling said regenerated pulping liquor as at least part of said pulping liquor in said digestion step, and separating solid sodium chloride from said pulping and recovery and regeneration cycle subsequent to said furnacing step and prior to said recycling step, the improvement wherein said introduction of said filtrates to said pulping and recovery and regeneration cycle is carried out by:

neutralizing part of said acid filtrate with fresh aqueous sodium hydroxide solution, using said neutralized filtrate as wash water for washing said digested cellulosic fibrous material in the portion of said washing step immediately prior to passage of washed pulp to said bleaching and purification operation, discharging the remainder of said acid filtrate from said pulp mill system, using part only of said alkaline filtrate as wash water for washing said digested cellulosic fibrous material prior to said washing with said neutralized filtrate in the remainder of said washing step, whereby said washing step is carried out wholly by said neutralized filtrate and said part of said alkaline filtrate, and passing the remainder of said alkaline filtrate directly to said pulping and recovery and regeneration cycle.

11. In a pulp mill system having a pulping and recovery and regeneration cycle and a bleaching and purification operation including the steps of digesting raw cellulosic fibrous material in a pulping liquor, washing the digested cellulosic fibrous material substantially free from spent pulping liquor, forming an aqueous spent liquor containing spent pulping liquor and spent wash water from said washing step, subjecting said aqueous spent liquor to furnacing to form a smelt, subjecting said washed digested cellulosic fibrous material to said bleaching and purification operation using bleaching chemicals including chlorine atoms and sodium hydroxide extraction solutions, washing said bleached and purified pulp substantially free from residual bleaching and purification chemicals, recovering a washed, bleached and purified pulp from said bleaching and purification operation, separating from said bleaching and purification operation an acid aqueous filtrate and an alkaline aqueous filtrate, said latter filtrates in combination including all the aqueous material introduced to said bleaching and purification operation less any water present in said washed, bleached and purified pulp, introducing said latter filtrates to said pulping and recovery and regeneration cycle, whereby said smelt contains sodium chloride, regenerating pulping liquor from the components of said smelt, recycling said regenerated pulping liquor as at least part of said pulping liquor in said digestion step, and separating solid sodium chloride from said pulping and recovery and regeneration cycle subsequent to said furnacing step and prior to said recycling step, the improvement wherein said introduction of said filtrates to said pulping and recovery and regeneration cycle is carried out by:

neutralizing part of said acid filtrate with fresh aqueous sodium hydroxide solution, using said neutralized filtrate as wash water for washing said digested cellulosic fibrous material in the portion of said washing step immediately prior to passage of washed pulp to said bleaching and purification operation, passing the remainder of said acid filtrate to said pulping and recovery and regeneration cycle subsequent to said furnacing step and prior to said recycle step while excluding said remainder of said acid filtrate from said recycled pulping liquor, using part only of said alkaline filtrate as wash water for washing said digested cellulosic fibrous material prior to said washing with said neutralized filtrate in the remainder of said washing step, whereby said washing step is carried out wholly by said neutralized filtrate and said part of said alkaline filtrate, and passing the remainder of said alkaline filtrate directly to said pulping and recovery and regeneration cycle.

12. The system of claim 2 wherein said remainder of said acid filtrate is neutralized with fresh sodium hydroxide solution.

13. The system of claim 2, wherein said bleaching and purification operation includes successively a first bleaching stage in which said pulp is bleached with an aqueous solution of chlorine dioxide and chlorine in which the chlorine dioxide provides the majority of the total available chlorine and washed to remove spent bleaching agent and to provide the acid aqueous filtrate containing bleaching liquor and spent wash water, a first purification stage in which said pulp is purified with aqueous sodium hydroxide solution and washed to remove spent sodium hydroxide solution and to provide an alkaline aqueous filtrate containing spent sodium hydroxide solution and spent wash water, a second bleaching stage in which said pulp is bleached with an aqueous solution of chlorine dioxide and washed to remove spent bleaching agent and provide a second bleaching stage filtrate containing spent bleaching liquor and spent wash water, a second purification stage in which said pulp is purified with aqueous sodium hydroxide solution and washed to remove spent sodium hydroxide solution and provide a second purification stage filtrate containing spent sodium hydroxide solution and spent wash water, and a third bleaching stage in which said pulp is bleached with an aqueous solution of chlorine dioxide and washed to remove spent bleaching agent and to provide a third bleaching stage filtrate containing spent bleaching liquor and spent wash water, and said washed, bleached and purified pulp is discharged from said third bleaching stage and said bleaching and purification operation further includes using water from external the bleaching and purification operation as wash water in said third bleaching stage using at least part of said third bleaching stage filtrate as wash water in said second purification stage, using at least part of said second purification stage filtrate as wash water in said second bleaching stage, using at least part of said second bleaching stage filtrate as wash water in said first purification stage, using part of said first purification stage filtrate as wash water in said first bleaching stage and providing all of said second bleaching stage, second purification stage and third bleaching stage filtrates in said acid filtrate and/or said alkaline filtrate, whereby countercurrent flow of wash water and pulp through said bleaching and purification operation is achieved and all liquid flowing into the bleaching and purification operation, with the exception of that leaving the operation with said washed, bleached and purified pulp, is discharged therefrom in said acid filtrate and said alkaline filtrate.

* * * * *